(12) United States Patent
Cohen

(10) Patent No.: US 10,678,202 B2
(45) Date of Patent: *Jun. 9, 2020

(54) AUTOMATED CONTROL FOR CERTAIN FUNCTIONS OF REFRIGERATORS AND OTHER DOMESTIC FACILITIES

(71) Applicant: Shemon Cohen, Ashkelon (IL)

(72) Inventor: Shemon Cohen, Ashkelon (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/558,112

(22) Filed: Sep. 1, 2019

(65) Prior Publication Data

US 2019/0384244 A1    Dec. 19, 2019

Related U.S. Application Data

(63) Continuation of application No. 14/964,735, filed on Dec. 10, 2015, now Pat. No. 10,409,236.

(30) Foreign Application Priority Data

Dec. 11, 2014 (IL) .......................................... 236214

(51) Int. Cl.
    *G05B 15/02*    (2006.01)
(52) U.S. Cl.
    CPC ...... *G05B 15/02* (2013.01); *G05B 2219/2642* (2013.01); *G05B 2219/2654* (2013.01)
(58) Field of Classification Search
    CPC ............ G05B 15/02; G05B 2219/2642; G05B 2219/2654
    See application file for complete search history.

(56) References Cited

U.S. PATENT DOCUMENTS

| | | | | |
|---|---|---|---|---|
| 5,808,278 A | * | 9/1998 | Moon | A47G 33/00 200/43.01 |
| 6,066,837 A | * | 5/2000 | McCormick | F24C 7/087 219/506 |
| 6,473,661 B1 | * | 10/2002 | Wollner | G05B 15/02 700/17 |
| 9,024,545 B2 | * | 5/2015 | Bloch | H05B 37/0281 301/116 |

(Continued)

FOREIGN PATENT DOCUMENTS

IL    200343    6/2014

OTHER PUBLICATIONS

Applicant-Initiated Interview Summary dated May 22, 2019 From the US Patent and Trademark Office Re. U.S. Appl. No. 14/964,735. (10 pages).

(Continued)

*Primary Examiner* — Michael J Huntley

(57) ABSTRACT

Smart home controller working with a household appliance, or a household appliance with the controller installed, and in particular refrigeration apparatus with a controller. The appliance has an auxiliary operation initiated automatically based on user activity, and the controller provides an auxiliary operation suppression unit configured to prevent said user activity from automatically triggering said auxiliary operation. The controller may be connected to operate the auxiliary operation suppression unit based on a calendar and locally calculated daylight times. The controller is useful for preventing refrigerator lights and the like from turning on when not wanted.

14 Claims, 4 Drawing Sheets

(56) References Cited

U.S. PATENT DOCUMENTS

| | | | | |
|---|---|---|---|---|
| 2003/0066827 | A1* | 4/2003 | Daum | F24C 7/082 |
| | | | | 219/492 |
| 2005/0133353 | A1* | 6/2005 | Whitman | H01H 3/20 |
| | | | | 200/333 |
| 2012/0181266 | A1* | 7/2012 | Frommer | F24C 3/12 |
| | | | | 219/492 |
| 2014/0166447 | A1* | 6/2014 | Thea | H05B 37/0281 |
| | | | | 200/19.01 |
| 2014/0327501 | A1* | 11/2014 | Cohen | H01H 3/161 |
| | | | | 335/39 |
| 2015/0006265 | A1* | 1/2015 | White | G06Q 30/0629 |
| | | | | 705/14.3 |
| 2016/0170392 | A1 | 6/2016 | Cohen | |

OTHER PUBLICATIONS

Notice of Allowance dated Jul. 17, 2019 From the US Patent and Trademark Office Re. U.S. Appl. No. 14/964,735. (7 pages).
Office Action and Search Report dated Nov. 19, 2015 From the Israel Patent Office Re. Application No. 236214 and Its Translation Into English.
Office Action dated Aug. 1, 2016 From the Israel Patent Office Re. Application No. 236214 and Its Translation Into English.
Office Action dated Sep. 12, 2019 From the Israel Patent Office Re. Application No. 253752 and Its Translation Into English. (12 pages).
Office Action dated Jun. 26, 2016 From the Israel Patent Office Re. Application No. 236214 and Its Translation Into English.
Office Action dated Apr. 27, 2017 From the Israel Patent Office Re. Application No. 236214 and Its Translation Into English. (4 pages).
Official Action dated Sep. 14, 2018 From the US Patent and Trademark Office Re. U.S. Appl. No. 14/964,735. (22 pages).
Official Action dated Jan. 18, 2019 From the US Patent and Trademark Office Re. U.S. Appl. No. 14/964,735. (25 pages).
Official Action dated Nov. 22, 2017 From the US Patent and Trademark Office Re. U.S. Appl. No. 14/964,735. (27 pages).
Official Action dated May 29, 2018 From the US Patent and Trademark Office Re. U.S. Appl. No. 14/964,735. (19 pages).

* cited by examiner

AUTOMATED CONTROL FOR CERTAIN FUNCTIONS OF REFRIGERATORS AND OTHER DOMESTIC FACILITIES

RELATED APPLICATIONS

This application is a continuation of U.S. patent application Ser. No. 14/964,735 filed on Dec. 10, 2015, which claims the benefit of priority of Israel Patent Application No. 236214 filed on Dec. 11, 2014. The contents of the above applications are incorporated herein by reference in their entirety.

FIELD AND BACKGROUND OF THE INVENTION

The present invention, in some embodiments thereof, relates to automated control for certain functions of refrigerators and other domestic appliances and facilities and, more particularly, but not exclusively, to automated shut off of certain functions according to a timetable.

A refrigerator is a widely used domestic appliance for keeping food chilled and thus allowing food to last longer. The basic refrigerator is a reverse heat engine and is often combined with a freezer. The refrigerator is generally intended to keep food at around 4 degrees centigrade and the freezer at around minus 20 degrees centigrade.

In most models of refrigerator, auxiliary functions are provided, such as an internal light that turns on when opening the door, and in addition, the operation of the motor may be affected by opening and closing the refrigerator door.

Such issues pose a problem for observant Jews, who regard the switching on and off of lights and other electrical equipment as forbidden on holy days such as the Sabbath and festivals, and hence there is the need to access food without switching on the light.

In many models of refrigerator, the light is operated by a simple mechanical switch located behind the door, and many people simply place a piece of sticky tape over the switch. In more advanced models, the opening of the door is electronically sensed and thus the sticky tape solution does not work. The problem is thus solved by removing the light bulb altogether. However in many refrigerators the light bulb is not immediately accessible.

Another solution involves inserting an additional switch for the lamp so that it can be switched to a permanent off state during the Sabbath or festival. A further solution involves connecting external electronics to the refrigerator which ensures both that the light does not operate and that the motor is not affected by opening the door. Finally there are certain models of refrigerator that have a built in Sabbath switch that sets the refrigerator into a state in which the offending operations are stopped.

All of these solutions suffer from one common disadvantage. The Sabbath observer has to remember to operate or implement the favored solution before the Sabbath starts. Failure to do so means lack of access to chilled food for a whole day. In particular the Sabbath observer, opening the refrigerator door on the Sabbath and seeing the light operated, determines that he/she is unable to close the door for fear of turning off the light, and at least if the door is open then food can be accessed, although the refrigerator motor will be operating at maximum trying to keep the food cold.

The issue is not restricted to refrigerators. With increasing automation, and with the coming of the smart home, more and more functions are becoming automated. The Sabbath observer generally welcomes these changes and improvements, but seeks a way to avoid them impinging on his Sabbath observance.

SUMMARY OF THE INVENTION

Time switches that operate on a weekly basis are available. However, simply using a time switch on the auxiliary functions is not a solution for two reasons. The Sabbath starts and ends at different times each week as its hours are determined by sunset times. Secondly, there are, in addition to the weekly Sabbath, eight or fifteen festival days on which the same issues apply, their dates being determined according to the Hebrew calendar.

The present embodiments use microprocessor control to switch off the unwanted auxiliary functions based on the Hebrew calendar and knowledge of the local time and location.

According to an aspect of some embodiments of the present invention, there is provided refrigeration apparatus with an auxiliary operation initiated automatically based on user activity, the apparatus further comprising:

an auxiliary operation suppression unit configured to prevent said user activity from automatically triggering said auxiliary operation, and a controller connected to operate said auxiliary operation suppression unit based on a calendar and locally calculated daylight times.

In an embodiment, the calendar is the Hebrew calendar.

In an embodiment, the locally calculated daylight times comprise a Sabbath onset time and a Sabbath end time calculated according to a current location.

An embodiment may comprise an interface for entering location coordinates to said controller.

In an embodiment, said auxiliary operation suppression unit comprises an actuator, the actuator located over a physical switch governing said auxiliary operation.

In an embodiment, said auxiliary operation is governed by a controller command based on output of a sensor, said auxiliary operation suppression unit configured to suppress said controller command.

In an embodiment, said auxiliary operation is governed by a controller command based on output of a sensor, said auxiliary operation suppression unit configured to suppress output of said sensor.

According to a second aspect of the present invention, there is provided a method for auxiliary operation suppression for a Refrigerator having an auxiliary operation, said auxiliary operation initiated automatically based on user activity, the method comprising:

obtaining a calendar and locally calculated daylight times, and carrying out said suppression by preventing said user activity from automatically triggering said auxiliary operation according to days based on said calendar and according to times based on said locally calculated daylight times.

According to a third aspect of the present invention, there is provided apparatus with an auxiliary operation initiated automatically based on user activity, the apparatus further comprising:

an auxiliary operation suppression unit configured to prevent said user activity from automatically triggering said auxiliary operation, and a controller connected to operate said auxiliary operation suppression unit based on a calendar and locally calculated daylight times.

According to a fourth aspect of the present invention, there is provided a method for auxiliary operation suppression for an appliance having an auxiliary operation, said auxiliary operation initiated automatically based on user activity, the method comprising:

obtaining a calendar and locally calculated daylight times, and carrying out said suppression by preventing said user activity from automatically triggering said auxiliary operation according to days based on said calendar and according to times based on said locally calculated daylight times.

According to a fifth aspect of the present invention, there is provided a smart home controller providing at least one automatic operation initiated automatically based on user activity, the controller further comprising:

an automatic operation suppression unit configured to prevent said user activity from automatically triggering said automatic operation, and a controller connected to operate said automatic operation suppression unit based on a calendar and locally calculated daylight times.

According to a sixth aspect of the present invention, there is provided a method for suppression of an operation initiated automatically based on user activity in smart control of a home, the method comprising:

obtaining a calendar and locally calculated daylight times, and carrying out said suppression by preventing said user activity from automatically triggering said automatic operation according to days based on said calendar and according to times based on said locally calculated daylight times.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
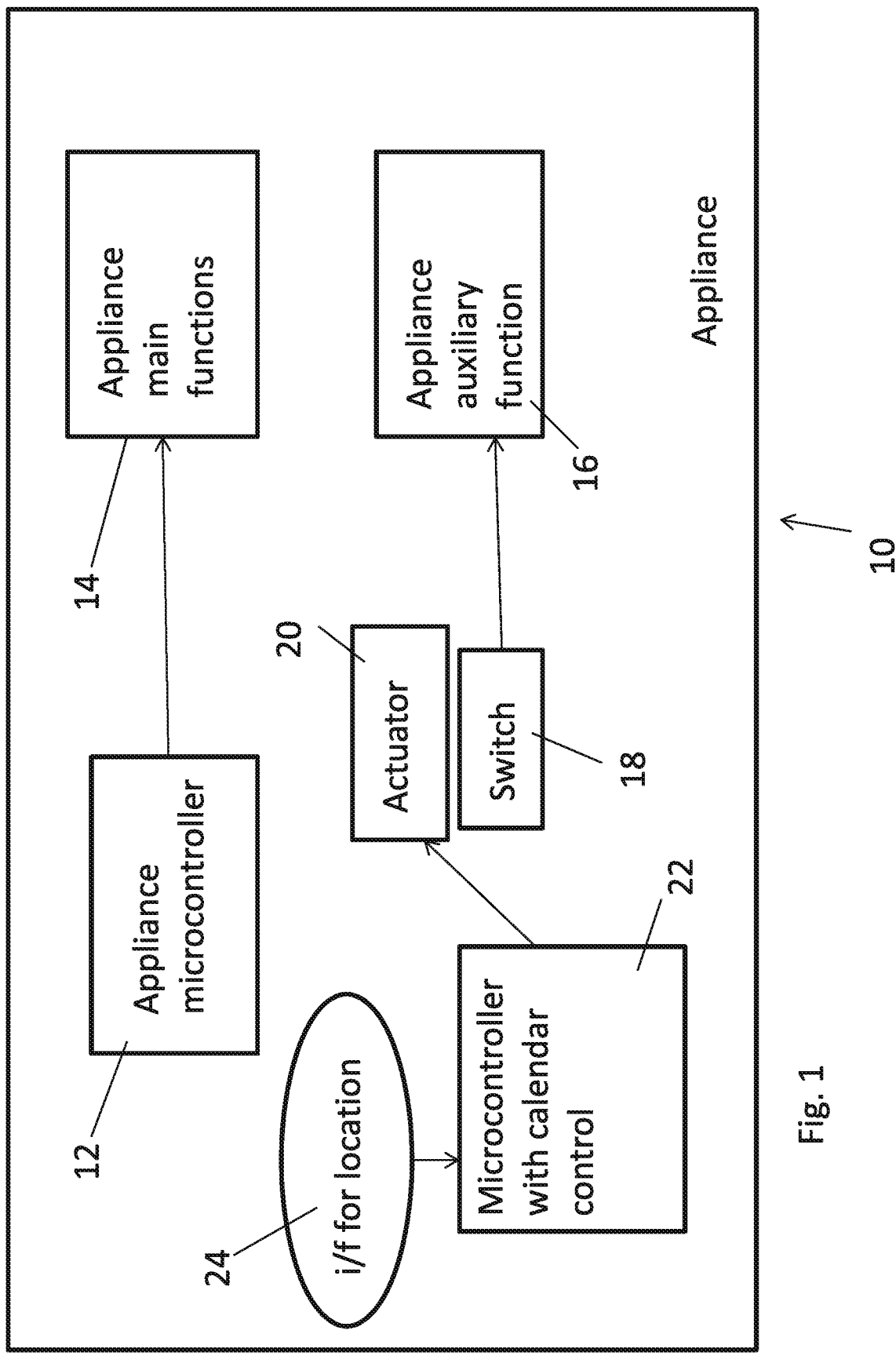
FIG. 1 is a simplified diagram showing an appliance such as a refrigerator with a suppression mechanism according to an embodiment of the present invention.

The present invention, in some embodiments thereof, relates to automated control for certain functions of refrigerators and other domestic appliances and facilities and for smart homes, and, more particularly, but not exclusively, to automated suppression of certain functions according to a timetable.

A smart home controller may work with a household appliance, or a household appliance may have such a controller installed, and in particular a refrigeration apparatus may have a controller. The appliance has an auxiliary operation initiated automatically based on user activity, and the controller provides an auxiliary operation suppression unit configured to prevent the user activity from automatically triggering the auxiliary operation. The controller may be connected to operate the auxiliary operation suppression unit based on a calendar and locally calculated daylight times. The controller is useful for preventing refrigerator lights and the like from turning on when not wanted.

Time switches that operate on a weekly plan are available. However, simply using a time switch on the auxiliary functions is not a solution for several reasons. The Sabbath starts and ends at different times each week as its hours are determined by sunset times. Tables of sunset times are often available but tend to be constructed for the region in general or based on a particular location in the time zone, thus failing to take into account local time and therefore actual sunset at the location. Furthermore, while Sabbath onset times are based on the local sunset, they are not identical to the sunset times. A further difficulty is that there are, in addition to the weekly Sabbath, eight or fifteen festival days on which the same issues apply, their dates being determined according to the Hebrew calendar.

The present invention provides microprocessor control to the auxiliary functions in question, which switches them off separately from the remaining functions in accordance with the days prescribed by the Hebrew calendar and times according to sunset at the location on local time.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates apparatus 10 such as a refrigerator. The refrigerator typically has microcontroller 12 which operates the appliance's main functions 14 such as refrigeration. An auxiliary operation 16 is initiated automatically based on user activity, for example a lamp is lit in the refrigerator based on opening of the door by the user. In the embodiment shown in FIG. 1 the lamp is lit by sensing the opening of the door. The lamp is controlled by switch 18. In one case the switch is a physical switch which is pressed closed or allowed to open by the door itself. In another case the opening and closing of the door is based on a sensor and switch 18 is an override switch.

An auxiliary operation suppression unit 20 prevents user activity, such as opening the door, from automatically triggering the auxiliary operation. In the case of physical switch 18 the suppression unit 20 would be an actuator.

A controller 22 is connected to operate the auxiliary operation suppression unit 20 based on a calendar and locally calculated daylight times. The calendar may be the Hebrew calendar, and the times may be Sabbath onset and ending times, as will be discussed in greater detail below. The Sabbath onset and ending times are local times requiring knowledge of the current location, and interface 24 allows users to enter current locations into the controller.

Figure 2:
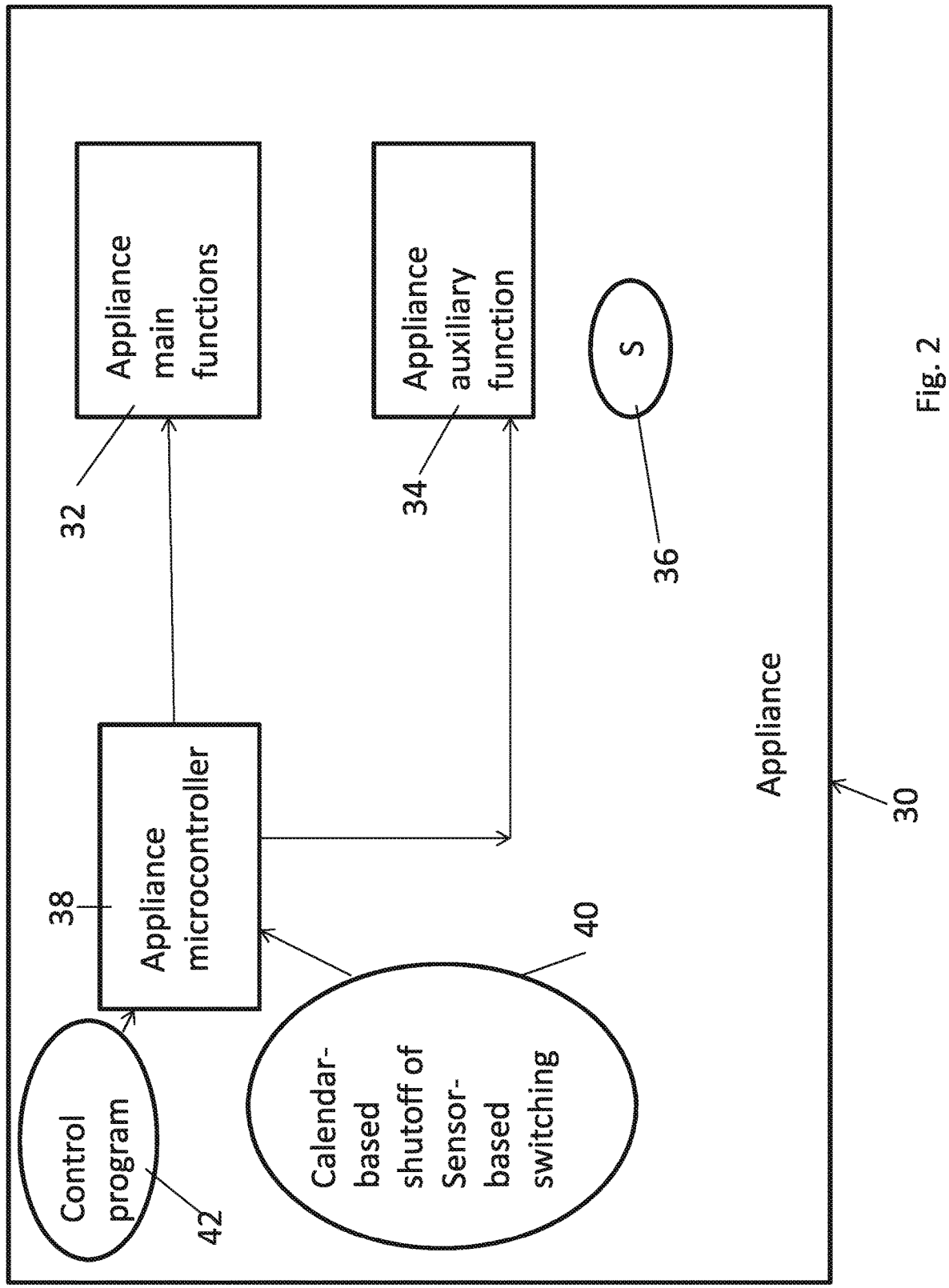
FIG. 2 is a simplified diagram showing an appliance such as a refrigerator, or a smart home, with a suppression mechanism according to a second embodiment of the present invention.

Reference is now made to FIG. 2, which is an alternative embodiment for an appliance 30 such as a refrigerator that does not have a physical switch for the auxiliary operation. Again the appliance has a main function 32 and an auxiliary function 34. A sensor 36 senses the specific user activity, such as opening the door and sends a signal to a controller 38. In normal operation the controller then sends a command to cause the auxiliary function to take place. The auxiliary operation suppression unit and calendar time controller are combined as an addition 40 to control program 42 that operates controller 38, and either suppresses the controller command operate the function or alternatively may suppress the output from the sensor.

The auxiliary operations may include modifications of the operation of the refrigerator motor. For example opening the door of the refrigerator may directly cause an increase in the level of operation of the refrigerator motor. Software suppression of the control signals may likewise prevent such increase.

In other cases the change in operation of the refrigerator motor may be due to a thermostat, which is affected by the opening of the door. In this case, most authorities do not see a problem but if required then the software can also suppress any change in operation due to output from the thermostat.

More particularly, there are refrigerators that have a physical switch for the auxiliary functions and those that have no physical switch or at least the switch is not accessible for separate actuation. In many refrigerators the auxiliary function is operated by software in response to sensor outputs.

In the case of a physical switch, an actuator is placed over the physical switch and microprocessor operation can operate the actuator to keep it switched off on the days and times required. This applies whether the physical switch is the primary operator of the auxiliary function or whether it is a backup operator. For example, lamp illumination may be door operated, but there may be a separate switch to shut down the lamp circuit say for changing the lamp.

In the case of a refrigerator having a separate switch for Sabbath operation, the actuator may be placed over the Sabbath operation switch.

In the case of a refrigerator that does not have a physical switch for auxiliary operations, the operations are all controlled in software. In this case, the calendar and time control is incorporated into the software.

The present embodiments are by no means limited to refrigerators, and may be applied to any other home appliance that includes auxiliary automatic functions that may require suppression.

Likewise the embodiments may be applied to smart homes and smart home controllers. The embodiment may be understood from FIG. 2, except that the appliance is the home as a whole and the smart home functions are divided into those which are problematic for the Sabbath observer and for which suppression is applied and those which are left to carry on. Smart home technology involves the use of computer and information technology to control home appliances and features such as heating, air conditioning, windows, lighting, home entertainment and information systems etc. Smart home technology can range from simple remote control of lighting through to complex computer/microcontroller based networks with varying degrees of intelligence and automation. Home automation is adopted for reasons of ease, security and energy efficiency.

In modern construction in industrialized nations, most homes have been wired for electrical power, telephones, TV outlets, such as cable or antenna, and a doorbell. Many household tasks were automated by the development of specialized automated appliances. For instance, automatic washing machines were developed to reduce the manual labor of cleaning clothes, and water heaters reduced the labor necessary for obtaining hot water.

The use of gaseous or liquid fuels, and later the use of electricity enabled increased automation in heating, reducing the labor necessary to manually refuel heaters and stoves. Development of thermostats allowed more automated control of heating, and later cooling.

As the number of controllable devices in the home rises, interconnection and communication becomes a useful and desirable feature. For example, a furnace can send an alert message when it needs cleaning, or a refrigerator when it needs service. If no one is supposed to be home and the alarm system is set, the home automation system could call the owner, or the neighbors, or an emergency number if an intruder is detected.

In simple installations, automation may be as straightforward as turning on the lights when a person enters the room. In advanced installations, rooms can sense not only the presence of a person inside but know who that person is and perhaps set appropriate lighting, temperature, music levels or television channels, taking into account the day of the week, the time of day, and other factors.

Other automated tasks may include reduced setting of the heating or air conditioning when the house is unoccupied, and restoring the normal setting when an occupant is about to return. More sophisticated systems can maintain an inventory of products, recording their usage through bar codes, or an RFID tag, and prepare a shopping list or even automatically order replacements.

Home automation can also provide a remote interface to home appliances or the automation system itself, to provide control and monitoring on a smartphone or web browser.

Some of the functions provided by home automation are problematic for the Sabbath observer while others are not. Suppression of the problematic functions at the correct time may be provided by the present embodiments.

The following discusses the calculation of the times and the dates.

The Hebrew calendar is neither a solar calendar like the Gregorian calendar, nor a lunar calendar like the Moslem calendar, but is a hybrid lunar-solar calendar, which makes its calculation far from trivial.

The following is a discussion about how to calculate the Hebrew calendar.

The Jewish calendar combines three unconnected astronomical phenomena: the rotation of the Earth about its axis, the day; the revolution of the moon about the Earth, the month; and the revolution of the Earth about the sun, the year. These three phenomena are independent of each other, and there is no correlation between them. The moon revolves around the Earth in about 29½ days. The Earth revolves around the sun in about 365¼ days, that is, about 12 lunar months and 11 days.

To coordinate between the above three phenomena, the Jewish calendar consists of 12 or 13 months of 29 or 30 days, and can be 353, 354, 355, 383, 384 or 385 days long. The centerpiece of the calendar is the new moon, referred to in Hebrew as the Molad.

A new month on the Jewish calendar begins with the Molad. The Molad for the month of Tishri is the most important one for calendar calculations, and is referred to as Molad Tishri.

Note that the calculated Molad does not correspond precisely to the astronomical new moon. The length of time from one astronomical new moon to the next varies somewhat because of the eccentric orbits of the Earth and Moon; however, the calendar Molad is set using a fixed average length of time: 29 days, 12 hours, and 793 parts, commonly written in an abbreviated form: 29 d 12 h 793p, where the part, or chelek, is a unit of time equal to 3⅓ seconds. There are 18 parts in a minute and 1,080 parts in an hour.

The time for the Molad is Jerusalem local time, which is not the same as the time on the clock, even in Jerusalem, since clocks use the time zone time, not the local time.

Figure 3:
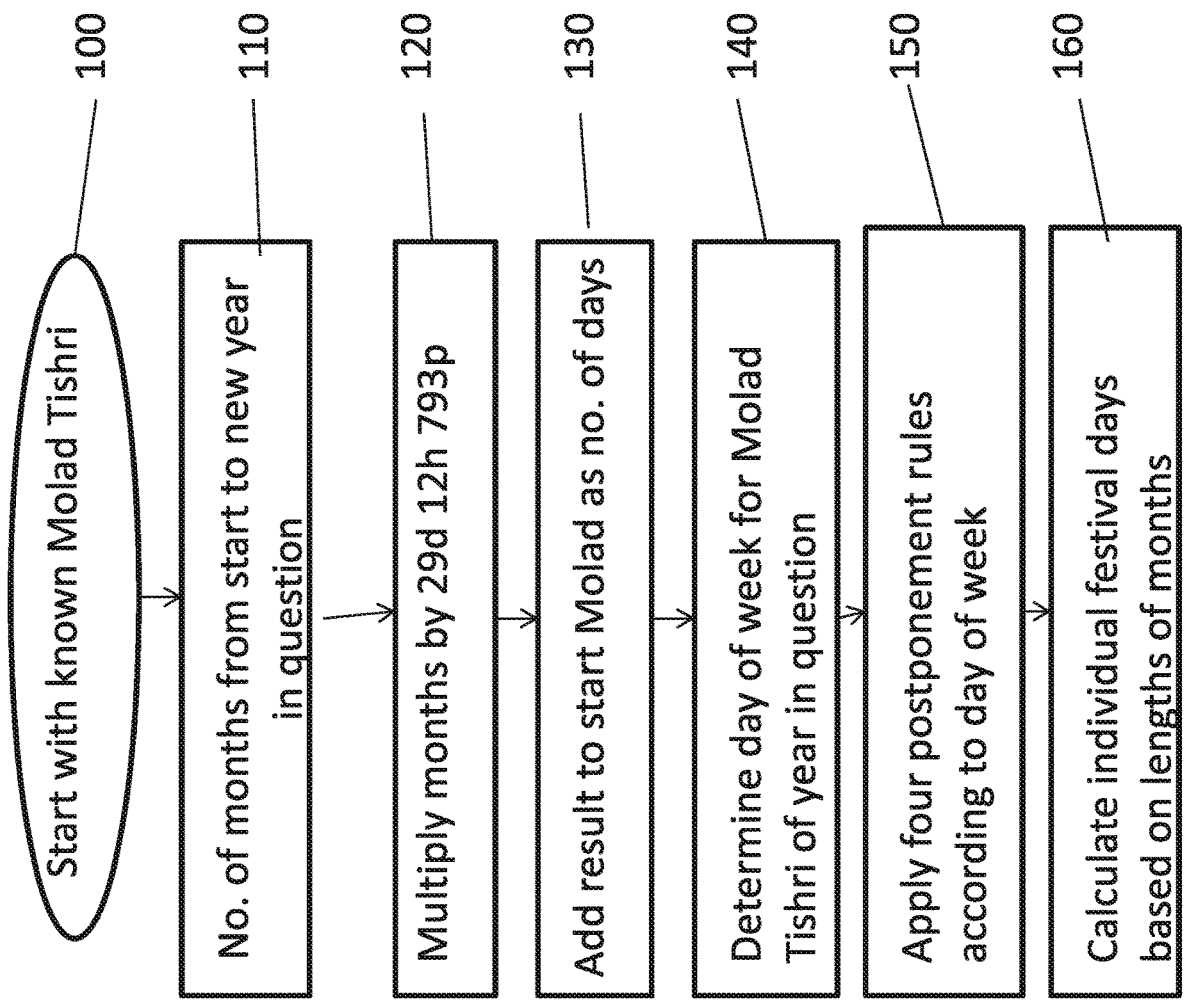
FIG. 3 is a flow chart showing steps in calculating dates of festivals using the Hebrew calendar.

Reference is now made to FIG. 3, which shows the stages involved in calculating the date of the New Year—Rosh Hashanah on the Jewish calendar.

The calculation begins with box 100, taking a known Molad Tishri, the day of the week and the corresponding date in the Gregorian calendar.

In box 110, the calculation determines the number of months between the known Molad and Molad Tishri of the year of interest.

In box 120, the number of months is multiplied by the length of the Molad interval: 29 d 12 h 793p to give a number of days and fractions of a day.

The result is then added to the known starting Molad as a number of days—box 130.

In box 140, the number of days modulo seven added to the start day of the week gives the day of the week of the Molad Tishri.

In box 150, the four postponement rules are used to determine the actual date to be used for the New Year—Rosh Hashanah for the current year.

In box 160, the secular date is obtained by adding the number of days elapsed, calculated in box 120, to the secular starting date and correcting for intervening leap years.

Box 110 in greater detail requires to determine how many months are between the starting point used and Tishri of the year of your end point. There are exactly 235 months in every 19-year cycle of leap years (12 12-month years plus 7 13-month years), but if the number of years is not evenly divisible by 19, then it is necessary to determine whether each remaining year is a regular year (12 months) or a leap year (13 months).

The leap year cycle is calculated as follows. Leap years occur in years 3, 6, 8, 11, 14, 17 and 19 of a 19-year cycle, and the 19-year cycle begins in the year 1, so you can simply divide the year number by 19 and examine the remainder. If the remainder is 3, 6, 8, 11, 14, 17 or 0 (the 19th year of the cycle) then the year is a leap year. Otherwise, it is not.

In box 120, we multiply the number of months by the average length of the Molad, which is 29 d 12 h 793p.

Box 130 requires adding the elapsed time calculated above to the starting date to get the ending date.

At this point, we note the number of days elapsed between our starting point and our ending point as a number of days. We note this at this point in the calculation, after the hours are rounded into the days but before the weekday of the starting Molad is added to the number of days. This number of days will be necessary to determine the Gregorian date in box 160.

Box 150 involves applying what are known as postponements or dechiyot, which are needed to find the correct days on which the festivals occur. There are four rules of postponement which postpone the date of Rosh Hashanah, but do not affect the calculated time of the Molad. One of the postponements is a general rule of rounding to ensure the year has a whole number of days, while the rest are designed to prevent oddities in the length of the year and the date of Rosh Hashanah.

Postponement 1: Molad Zakein—General Rounding Rule

The first postponement is Molad Zakein, meaning an "old" Molad. If the Molad occurs at or after noon, the Molad is considered to be "old" and we round to the next day. This rule is quite commonly applied, affecting a quarter of all years.

The rule of Molad Zakein simply means that a Molad at or after noon relates to the day that starts at the next sunset, 4-10 hours later, rather than the previous sunset which was 14-20 hours earlier.

Note that when postponements like this apply, a day must be added to the elapsed time for purposes of calculating the Gregorian equivalent date, but the Molad does not change. The unchanged Molad is used for purposes of calculating subsequent years and for certain religious purposes.

Postponement 2: Lo A"DU Rosh

The second postponement is known as Lo A"DU or Lo A"DU Rosh. This rule states that Rosh Hashanah cannot occur on a Sunday, a Wednesday or a Friday. If the calculated Molad occurs on one of these days of the week, Rosh Hashanah is postponed by a day to prevent other problems with the calendar.

This postponement is also commonly applied, as you might imagine. It applies to three out of seven days, so one would expect it to occur almost half of the time.

Note that the postponements of Molad Zakein and Lo A"DU Rosh can work in combination. Thus, the rule of Molad Zakein must be checked before the rule of Lo A"DU Rosh.

Postponement 3: Gatarad

The remaining two dechiyot are much less commonly applied.

Postponement Gatarad holds that if Molad Tishri in a simple 12-month, non-leap, year occurs on a Tuesday at 9 h 204p or later, Rosh Hashanah is postponed to the next day, a Wednesday, which by the effect of Lo A"DU Rosh would then be postponed to Thursday.

Why does such a complicated rule exist? This rule prevents the possibility that a year might be 356 days, an invalid length. Consider: a Molad Tishri at 3 d 9 h 204p would not be postponed by Molad Zakein or Lo A"DU Rosh. Add 12 lunar cycles (354 d 8 h 876p) to the next year's Rosh Hashanah and you get 7 d 18 h 0p with 354 days elapsed. Molad Zakein applies to the following year, postponing Rosh Hashanah to the next day, a Sunday, with 355 days elapsed. Lo A"DU Rosh is then triggered, postponing Rosh Hashanah and leaving 356 days elapsed and making the current year an invalid length. Gatarad takes days away from the following year and adds them to the preceding year, so both years are a valid length.

Note that Gatarad invariably triggers Lo A"DU Rosh. Gatarad only applies when Rosh Hashanah is Tuesday and Gatarad postpones Rosh Hashanah to Wednesday. Lo A"DU Rosh then postpones Rosh Hashanah to Thursday.

Note also that this rule is not combined with Molad Zakein. If Molad Zakein applies to the current year, Gatarad is unnecessary; thus Gatarad applies only to Molads between 9 h 204p and 17 h 1079p.

Postponement 4: Betutkafot

Like Postponement Gatarad, this rule is not very commonly applied and is also designed to prevent a year from having an invalid length. Postponement Betutkafot prevents a leap-year from having 382 days, too few days, by postponing Rosh Hashanah of the non-leap year following the leap year.

If Molad Tishri in a year following a leap year occurs on Monday after the 15th hour and 589 parts, then it is postponed to the next day. The rule is applied only if the actual Molad occurs on Monday, not if it is postponed to Monday. Like Gatarad, the rule really only applies to Molads before noon, because Molad Zakein handles the postponements for Molads at or after noon. Unlike Gatarad, Betutkafot does not trigger Lo A"DU Rosh, because Betutkafot postpones Rosh Hashanah from a Monday to a Tuesday and Tuesday is an acceptable day for Rosh Hashanah.

Microprocessors are typically programmed with the Gregorian date, so a final stage is to determine the Gregorian date, at least for a starting point. Typically, one would calculate the Gregorian date for Rosh Hashanah and work from there. One may take the elapsed days calculated in Step 4, add any additional days triggered by the postponements in Step 5, and add this number of days to the date of Rosh Hashanah for the known Molad.

The principles above are sufficient to convert Rosh Hashanah to a Gregorian date for any year. However, for the remaining festivals, one may calculate either that year's Rosh Hashanah, the following year's Rosh Hashanah or both and use this information to work out the date based on the lengths of months. Additional information relates to the month of the festival being considered.

The following contains information for all of the months, irrespective of whether festivals are involved.

Tishri

Tishri is the month of Rosh Hashanah, so you simply add the date of the month to Rosh Hashanah and subtract 1 (because Rosh Hashanah is Day 1).

Cheshvan

Cheshvan is the second month of the calendar year, and the preceding month of Tishri is always 30 days, so you simply take the current Rosh Hashanah, add 29 days (30–1 for Rosh Hashanah) and add the date of the month.

Kislev

Kislev is the hardest month to calculate. You cannot simply work forward from the current year's Rosh Hashanah, because the preceding month of Cheshvan can be 29 or 30 days, nor can you work backward from the next year's Rosh Hashanah, because Kislev itself can also be 29 or 30 days. To calculate the length of Kislev, you need to know the date of Rosh Hashanah of both the current year and the next year, then calculate the difference between them to determine the length of the current year. If the year is 353, 354, 383 or 384 days, then Cheshvan is 29 days and you can determine a date in Kislev taking the current Rosh Hashanah, adding 58 days, then adding the date of the month. If the year is 355 or 385 days, then Cheshvan is 30 days and you can determine a date in Kislev by taking the current Rosh Hashanah, adding 59 days, then adding the date of the month.

Tevet, Shevat

The remaining months of the year are of unchanging length, but the number of months varies depending on whether the year is a leap year! Tevet and Shevat are best calculated by working backwards from the following year's Rosh Hashanah and subtracting an additional 30 days in a leap year. Tevet's offset in a non-leap year is −266; Shevat's is −237.

Adar, Adar I and Adar II

Adar is always offset −207 from the following Rosh Hashanah; however, in regular years, Adar is the 12th month of the year (starting from Nissan), and in leap years, is known as Adar II and is the 13th month of the year. Adar I, the extra month inserted as the 12th month in leap years, is always offset −237 days from Rosh Hashanah.

Nissan, Iyar, Sivan, Tammuz, Av, Elul

The remaining months of the year are all of unchanging length and not affected by leap years. Simply subtract the appropriate number of days from the following year's Rosh Hashanah and add the date of the month.

Figure 4:
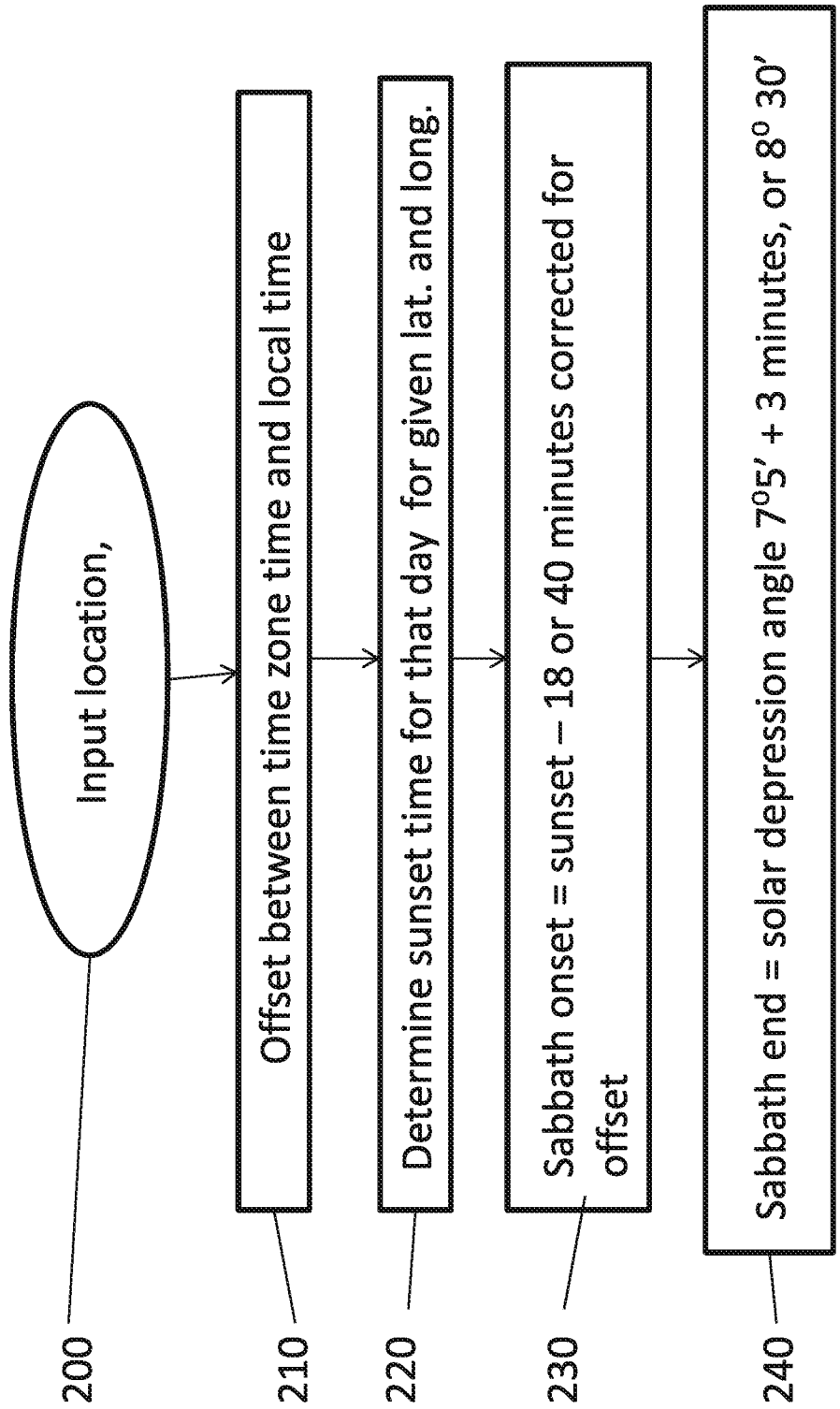
FIG. 4 is a simplified diagram showing how to obtain Sabbath onset and ending times.

Reference is now made to FIG. 4, which illustrates calculation of Shabbat onset times requires longitude and latitude at the location in question. Local time at any given location is an offset of the time zone time being observed which can be obtained using the longitude and latitude, provided in box 200. Published sunset times are not likely to be for either the given location or based on the local time and so cannot be used. Instead, an offset is calculated between clock time and actual local time, box 210, and actual sunset times for the given location are calculated in terms of local time—box 220—and then may be converted into the clock time using the offset. The Sabbath onset time is for most locations 18 minutes prior to the local sunset time. In Jerusalem, the Sabbath onset time is 40 minutes prior to the local sunset time—box 230.

The Sabbath ending time is based on a definition of nightfall that depends on the depression angle of the sun below the horizon. Some authorities use a solar depression angle of seven degrees and five minutes, and then add three minutes to the resulting time. Other authorities use a solar depression angle of eight and a half degrees with no time added—box 240.

In practice tables are available of the calendar and of Sabbath times, and numerous programs are available for calculating either. The microprocessor however needs to know the local coordinates and the time according to the local time zone in order to obtain the correct answers.

It is expected that during the life of a patent maturing from this application many relevant actuators and control techniques for refrigeration will be developed and the scope of the corresponding terms are intended to include all such new technologies a priori.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the above description is to be construed as if this combination were explicitly written. Conversely, various features of the invention, which are, for brevity, described in the context of a single embodiment, may also be provided separately or in any suitable subcombination or as suitable in any other described embodiment of the invention, and the above description is to be construed as if these separate embodiments were explicitly written. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. Refrigeration apparatus with an auxiliary operation initiated automatically based on user activity, the apparatus further comprising:
    an auxiliary operation suppression unit configured to prevent said user activity from automatically initiating said auxiliary operation, said auxiliary operation suppression unit being implemented in software,
    a sensor, said sensor being configured to sense the user activity, the user activity being indirect in respect of the sensor, and provide a sensor output indicative of said user activity, and
    a controller, connected to said sensor, the sensor output being connected to trigger a controller command at said controller, the controller command connected to initiate the auxiliary operation, the controller further connected to operate said auxiliary operation suppression unit based on a calendar said controller with said auxiliary operation suppression unit thereby providing a weekday mode and a Sabbath mode, wherein in said weekday mode said auxiliary operation is initiated by said controller command based on said sensor output, and in said Sabbath mode said auxiliary operation suppression unit suppresses said controller command such that said auxiliary operation is not initiated, while said sensor remains connected to said controller, said sensor having a same input in said Sabbath mode as in said weekday mode and continuing to produce said sensor output in response to said user activity both in said Sabbath mode and in said weekday mode and said controller continuing to receive said output both in said Sabbath mode and said weekday mode.

2. The apparatus of claim 1, wherein the calendar is the Hebrew calendar.

3. The apparatus of claim 1, wherein the controller is further configured to obtain locally calculated daylight times and therefrom to determine a Sabbath onset time and a Sabbath end time calculated according to a current location.

4. The apparatus of claim 1, comprising an interface for entering location coordinates to said controller.

5. The apparatus of claim 1, wherein said auxiliary operation suppression unit comprises an actuator, the actuator located over a physical switch governing said auxiliary operation.

6. Method for auxiliary function suppression for an appliance having an auxiliary function, said auxiliary function initiated automatically based on user activity, the method comprising:
    obtaining a calendar;
    based on said calendar, providing in software an auxiliary function suppression operation, to provide a Sabbath mode with said auxiliary function suppression operation and a weekday mode without said auxiliary function suppression operation, said auxiliary function suppression operation comprising:
        sensing said user activity based on a sensing output produced by a sensor in response to said sensing, said user activity being indirect in respect of said sensor;
        issuing a signal to a controller indicating occurrence of said user activity, said controller being arranged to detect said signal and issue a controller command to initiate said auxiliary operation upon said detection of said signal; and
        suppressing issuance of said controller command while said sensor remains connected, said sensor continuing to sense said user activity and issue said signal when said user activity is sensed, and said controller continues to detect said signal, thereby suppressing said auxiliary function in said Sabbath mode while operation of said sensor is unchanged.

7. The method of claim 6, wherein the calendar is the Hebrew calendar.

8. The method of claim 6, further comprising obtaining locally calculated daylight times and determining a Sabbath onset time and a Sabbath end time calculated according to a current location.

9. The method of claim 6, comprising using an interface for entering location coordinates.

10. The method of claim 6, wherein the appliance is a refrigerator.

11. Smart home controller providing at least one automatic operation initiated automatically based on user activity, the user activity sensed at a continuous operation sensor, the continuous operation sensor providing a signal indicating said sensing to said smart home controller, said smart home controller detecting said signal, the controller comprising:
- an automatic operation suppression unit configured to prevent said user activity from automatically initiating said automatic operation via said continuous operation sensor, said user activity being indirect in respect of said sensor; and
- wherein the smart home controller is connected to operate said automatic operation suppression unit based on a calendar, wherein said auxiliary operation is governed by a controller command based on said signal of said continuous operation sensor, said auxiliary operation suppression unit configured to suppress said controller command, while said continuous operation sensor is switched on and said user activity continues to be sensed, and the continuous operation sensor continues to provide said signal indicating said user activity to said smart home controller, and said smart home controller continues to detect said signal, said automatic operation suppression unit being implemented in software; said controller thereby providing a weekday mode in which said user activity initiates said automatic operation, and a Sabbath mode in which said user activity is sensed, and produces a sensor output to said controller but which does not initiate said activity.

12. The apparatus of claim 11, wherein the calendar is the Hebrew calendar.

13. The apparatus of claim 11, wherein the smart home controller is further configured to use locally calculated daylight times to determine a Sabbath onset time and a Sabbath end time calculated according to a current location.

14. The apparatus of claim 11, comprising an interface for entering location coordinates to said controller.

* * * * *